United States Patent [19]
Steusloff, deceased

[11] 3,795,957
[45] Mar. 12, 1974

[54] APPARATUS FOR BORING AND BURNISHING INTERNAL CYLINDRICAL SURFACES OF METALLIC WORKPIECES

[76] Inventor: Adalbert Steusloff, deceased, late of 514 Kolnerstrasse, Erkelenz, Germany by Herta Steusloff, heiress

[22] Filed: Feb. 15, 1973

[21] Appl. No.: 332,747

[30] Foreign Application Priority Data
Feb. 26, 1971 Germany.............................. 2209234

[52] U.S. Cl........................... 29/90, 29/566, 29/567, 408/22, 408/56
[51] Int. Cl............................................. B24b 39/02
[58] Field of Search.......... 29/90, 566, 567; 408/22, 408/56

[56] References Cited
UNITED STATES PATENTS
| | | | |
|---|---|---|---|
| 1,436,669 | 11/1922 | Ness................................... | 29/90 X |
| 2,056,706 | 10/1936 | Blazek et al. ....................... | 29/90 X |
| 3,242,567 | 3/1966 | Adam et al. ........................ | 29/90 X |
| 3,559,258 | 2/1971 | Gardner................................. | 29/90 |

*Primary Examiner*—Leonidas Vlachos
*Attorney, Agent, or Firm*—Michael S. Striker

[57] ABSTRACT

A combined precision boring and burnishing tool, particularly for use in a vertical-spindle boring machine wherein the workpiece is mounted in a support so that a stream of coolant can enter at the upper end and leaves at the lower end of the open-end hole in the workpiece. The tool has a holder which is rotatable by a spindle and supports a set of radially adjustable cutters located in front of a set of radially adjustable burnishing rollers. The chips which are removed by the cutters are evacuated from the hole by the stream of coolant whose flow is throttled between the cutters and the burnishing rollers. The rollers are retracted in automatic response to movement of the tool in a direction to withdraw it from the hole. The cutters are retracted by hand through the intermediary of an adjusting mechanism which is accessible at the front or rear end of the tool and is actuated after the spindle is arrested but before the tool is withdrawn from the workpiece.

12 Claims, 3 Drawing Figures

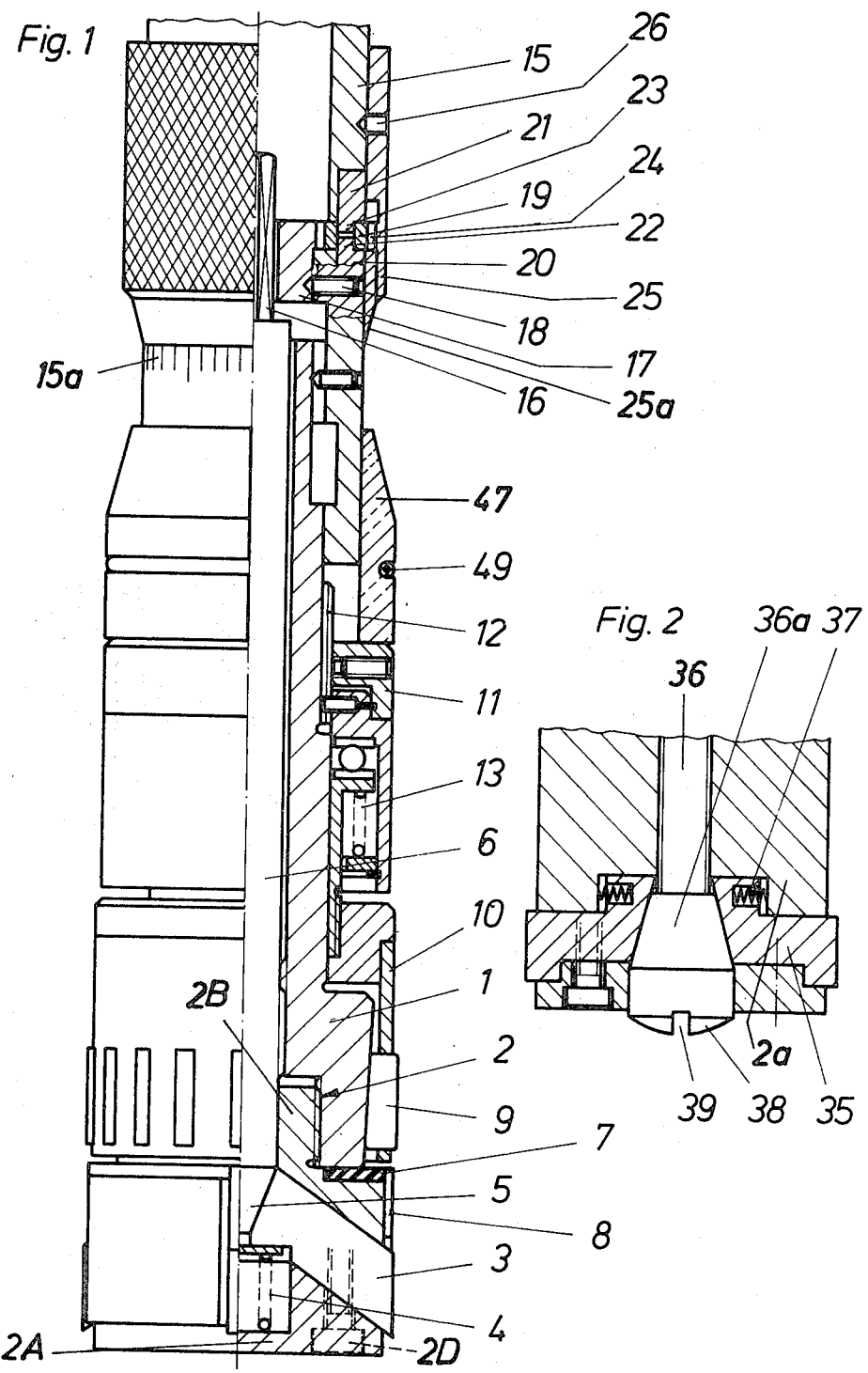

APPARATUS FOR BORING AND BURNISHING INTERNAL CYLINDRICAL SURFACES OF METALLIC WORKPIECES

BACKGROUND OF THE INVENTION

The present invention relates to improvements in tolls which permit grouped operations, particularly to improvements in so-called boring bars which can be utilized for successively machining internal cylindrical surfaces of workpieces to an accurate smooth finish in one bar stroke. Still more particularly, the invention relates to improvements in tools which can be used for removal of material and subsequent burnishing of surfaces surrounding open-end holes or bores in metallic workpieces. The invention further relates to adapters or supports which can be employed to facilitate the utilization of improved tools in conventional machine tools, such as lathes, milling machines or boring machines.

It is already known to carry out grouped operations on external surfaces of cylindrical workpieces. For example, it is known to employ in a lathe a turning tool which is followed by a burnishing tool including several cylindrical elements which roll along the surface of the workpiece behind the turning tool to thereby improve the finish of such surface. The shavings or chips which are removed by the turning tool and tend to adhere to the external surface of the workpiece between the turning tool and the burnishing rollers are removed, either by the action of centrifugal force alone or by mechanical and/or hydraulic means, for example, by means of a scraper and/or by means of one or more pressurized fluid streams which are directed against the external surface of the workpiece behind the turning tool. The thus loosened shavings or chips automatically leave the surface of the workpiece under the action of gravity. The same principle is employed in many types of shaving machines for elongated metallic workpieces wherein a head carries material removing and burnishing tools. Reference may be had to German patent No. 661,771.

The just described mode of successively machining and burnishing workpieces is not suited for treatment of internal surfaces, especially of surfaces which surround blind or open-end holes or bores in metallic workpieces. As a rule, a hollow workpiece is subjected to a burnishing treatment when it is to receive a male part with an extremely small tolerance. This cannot be achieved by resorting to the aforementioned method of carrying out grouped operations on external surfaces because the shavings or chips which are removed by the cutter or cutters cannot be expelled from a hole under the action of centrifugal force. The depth of grooves which are formed in a surface by the cutters of a turning tool is in the range of 20 microns. Such grooves are deep enough to retain chips or shavings, especially since the removed material tends to adhere to an internal surface under the action of gravity. If the burnishing elements are placed a short distance behind the turning tool which moves axially to treat an internal cylindrical surface, the burnishing elements roll over the chips which remain in the grooves formed by the turning tool so that the burnishing action is likely to reduce the quality of the internal surface. The distance between the turning tool and the burnishing elements therebehind should be as small as possible in order to reduce the likelihood of misalignment due to flexing and/or eccentricity of turning tool relative to the burnishing elements.

It was already proposed to evacuate the chips which are removed by a tool from the internal cylindrical surface of a workpiece by employing one or more streams of liquid coolant. Such mode of removing chips is normally employed when the material removing tool is to drill a hole in a solid workpiece. The liquid coolant is admitted by way of an axial hole in the shank of the drill and flows rearwardly in the space between the drill and the surface surrounding the bore whereby the fluid entrains the chips. Tools of such type are known as single-lipped drills.

It is further known to provide a rotary drill with a burnishing or rolling portion which forms part of the shank and is located immediately behind the cutting edges. The use of such tools is limited to drilling of holes because the coolant can remove chips only by flowing counter to the direction of penetration except if the tool is used in a special deep-boring machine wherein the coolant can flow through the hole in the form of a continuous stream. Such special machines are quite expensive and are normally not available in smaller and medium-sized machine shops.

German printed publication No. 1,954,337 discloses a burnishing tool whose material-engaging elements (normally rollers) are automatically retracted when the drive shaft is caused to move rearwardly. Analogously, certain boring tools comprise heads with retractable material removing cutting elements. The purpose of retractable burnishing and cutting elements is to avoid damage to the internal surface of a workpiece during withdrawal of the tool. Combinations of retractable material removing and burnishing elements are not known in the art, probably because of the anticipated high cost of discrete retracting mechanisms for the burnishing and material removing portions. The retraction of both portions must take place automatically or by hand from the rear end of the tool if the latter is to be capable of being used in blind holes.

SUMMARY OF THE INVENTION

An object of the invention is to provide a combined precision boring and burnishing tool and to provide a novel adapter or support which renders it possible to use the tool in available machine tools, especially in vertical-spindle boring machines, lathes and/or milling machines.

Another object of the invention is to provide the combined boring and burnishing tool with novel means for retracting its material removing and burnishing elements and to combine the support with novel means for facilitating the removal of chips from the holes of workpieces.

A further object of the invention is to provide an apparatus which embodies the improved support and the improved tool and is capable of being used in conventional machine tools for precision treatment of internal surfaces of workpieces having open-end holes.

The invention is embodied in a machine tool, especially in a vertical-spindle boring machine, and more particularly in an apparatus which can be installed in such machine tools for precision boring and burnishing of workpieces having openend holes. The apparatus comprises a hollow support (preferably a two-piece socket adapted to be mounted on the table of a vertical-spindle boring machine) which can receive a workpiece, means for circulating a fluid (e.g., oil) through the hole of the workpiece in the support so that the fluid enters at one end and leaves at the other end of the hole in the workpiece in the support, and a combined boring and burnishing tool having a front end and a rear end (i.e., a lower end and an upper end if the tool is used in a vertical-spindle boring machine) and including a holder which is movable axially into and toward or away from the other end of the hole in the workpiece mounted in the support, a spindle which is operatively connected with and serves to rotate the holder, and at least one cutter mounted in the holder at the front end of the tool to remove material from the workpiece in the support during rotation and axial movement of the holder toward the other end of the hole. The cutter is movable substantially radially of the holder and the tool further comprises adjusting means which is accessible at the front or rear end of the tool and is actuatable to effect a retraction of the cutter into the holder prior to movement of the holder away from the other end of the hole in the workpiece in the support, at least one burnishing element (such as a conical roller which is rotatable and movable radially relative to the holder) mounted in the holder behind the cutter, as considered in the direction of fluid flow in the hole of the workpiece, to treat the internal surface of the workpiece behind the cutter, and means for retracting the burnishing element from engagement with the workpiece in response to movement of the holder away from the other end of the hole.

The holder preferably includes a back support having a conical external surface against which the burnishing element abuts.

In accordance with a first embodiment of the invention, the adjusting means includes a portion (such as an internally threaded sleeve which surrounds the spindle at the rear end of the tool) which can be manipulated by hand to move the cutter radially of the holder in response to rotation a gear which receives torque from the sleeve by way of a pinion in the spindle and thereby moves axially a conical member against which the inner edge face of the cutter abuts.

In accordance with a second embodiment of the invention, the conical member has an exposed first coupling portion which is located at the front end of the tool and engages with a second coupling portion which is rotatably mounted in the machine and extends into the support at the other end of the hole in the workpiece. When the first coupling portion engages with the second coupling portion, the latter is held against rotation by a suitable arresting device and the axial position of the conical member is thereupon adjusted by rotating the holder relative to the conical member, for example, by hand through the intermediary of the spindle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly axial sectional view of a tool which forms part of the improved apparatus and is constructed and assembled in accordance with a first embodiment of the invention;

FIG. 2 is a fragmentary axial sectional view of the front end portion of a modified tool.

DESCRIPTION OF THE PREFERRED EMBODIMENTS

Figure 3:
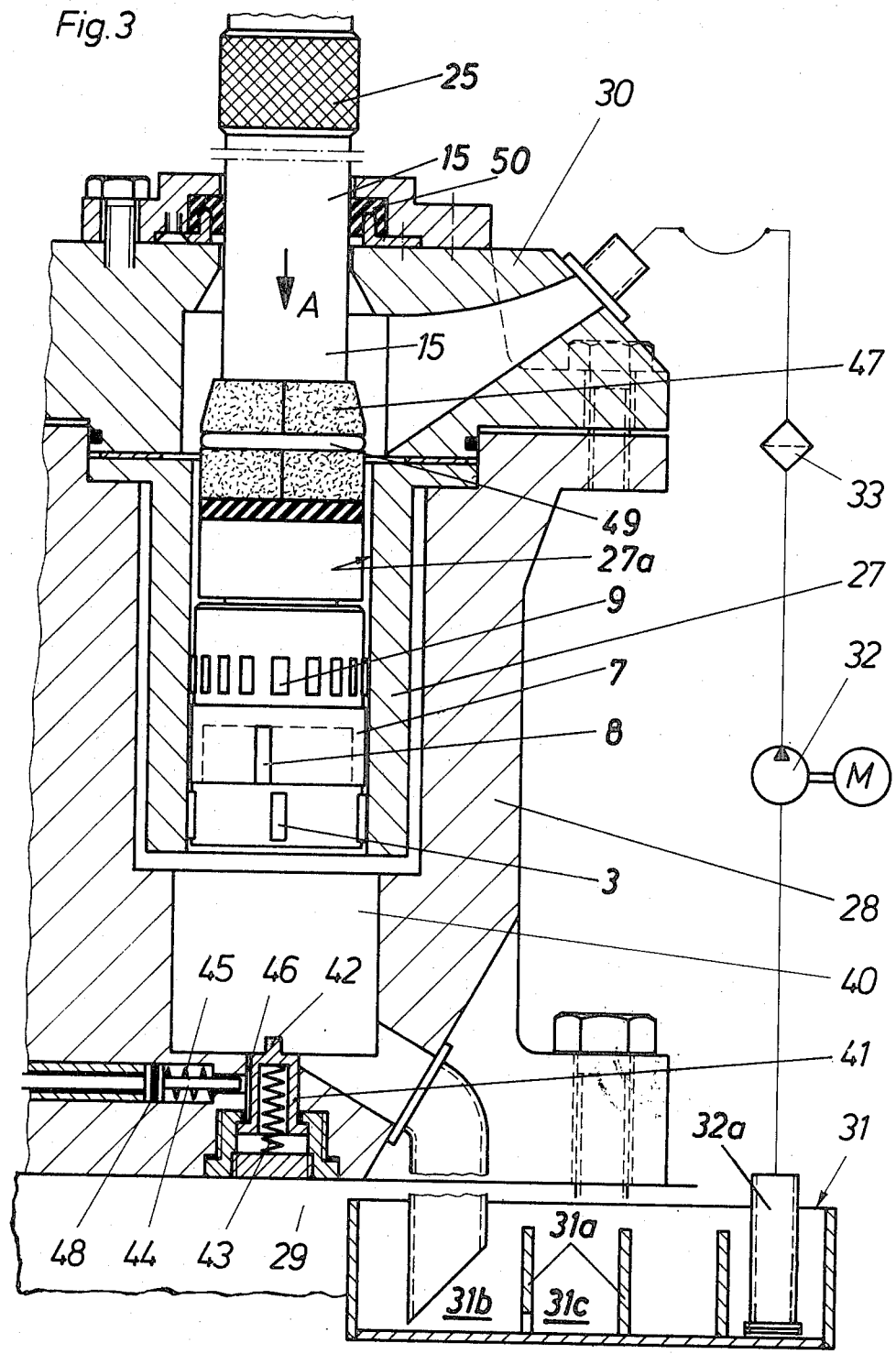
FIG. 3 is an axial sectional view of the support for a workpiece and a diagrammatic view of the fluid circulating means, the tool of FIG. 1 being shown in a position it assumes during treatment of the workpiece.

Referring first to FIG. 1, there is shown a precision boring and burnishing tool which comprises a holder including a hollow back support 1 having a conical external surface serving as an abutment for burnishing elements in the form of tapered rollers 9. The rollers 9 are mounted in a cage 10 and roll along the internal surface of a workpiece 27 (see FIG. 3) during penetration of the tool into the open-end hole 27a.

The back support 1 is provided with internal threads meshing with external threads on the smaller-diameter rear portion of a head 2 which forms part of the aforementioned holder and supports a set of material removing elements or cutters 3. The cutters 3 are received in rearwardly and inwardly inclined slots of the head 2 and their inner edge faces abut against a conical adjusting member 5 mounted at the front end of a shifting rod 6 which is movable lengthwise in the axial bore of the back support 1. The cutters 3 are biased by one or more springs 4 mounted in the front section 2A of the head 2 so that the aforementioned inner edge face of each cutter always abuts against the adjusting member 5. The head 2 is surrounded by a flow restricting cap 7 having slot-shaped cutouts or channels 8 for the flow of a coolant toward the cutters 3. The cap 7 is located between the annuli of cutters 3 and rollers 9.

The cage 10 for the burnishing rollers 9 is connected with a nut 11 which is adjustably secured to the shank 12 of the back support 1. The extent to which the rollers 9 extend outwardly beyond the cage 10 can be changed by changing the axial position of the nut 11 relative to the shank 12. In this manner, the burnishing rollers 9 can treat cylindrical internal surfaces of different diameters. Helical springs 13 tend to move the back support 1 downwardly as viewed in FIG 1, but allow the rollers 9 to move radially inwardly during withdrawal of the tool from the hole 27a. The springs 13 take up the weight of the cage 10. When the holder including the back support 1 and the head 2 is pulled upwardly and the rollers 9 engage the internal surface of a workpiece, the back support 1 moves relative to the cage 10 against the opposition of springs 13 so that the conical external surface of the back support allows the rollers 9 to move radially inwardly and to become disengaged from the workpiece.

The back support 1 is further directly connected with a torque-transmitting spindle 15. During retraction of the tool, the friction between the rollers 3 and the internal surface of the workpiece 27 is greater than the friction between the rollers 3 and the conical external surface of the back support 1. Therefore, the back support 1 moves relative to the the rollers 3 against the opposition of springs 13, namely, upwardly as viewed in FIG. 1, so that the distances between the rollers 3 decrease and the rollers become separated from the workpiece.

In other words, the rollers 3 are disengaged from the workpiece in automatic response to movement of the tool in a direction to withdraw it from the hole 27a.

In order to change the effective diameter of the annulus of cutters 3 in the head 2, the shifting rod 6 is moved axially whereby the conical adjusting member 5 causes the cutters 3 to move radially outwardly against the opposition of springs 4 or allows the springs 4 to move the cutters 3 radially inwardly. In other words, the inner edge faces of cutters 3 always abut against the external surface of the adjusting member 5.

The shifting rod 6 extends rearwardly all the way into the hollow spindle 15 and its rear end portion 16 is provided with a square head meshing with the complementary bore of a gear 17. The latter is provided with an external circumferential groove for the tips of pins 18 mounted in the spindle 15 and meshes with an eccentric pinion 19 which is rotatable in the spindle 15. To this end, the spindle 15 carries two bearing members 20, 21 provided with coaxial trunnions 22, 23 for the pinion 19. This pinion further mates with the internal threads 24 of a sleeve-like handgrip member 25 having a roughened (e.g., milled) external surface to facilitate its rotation. The handgrip member 25 is held against axial movement on the spindle 15 by one or more radial pins 26 which extend into an external annular groove of the spindle 15. Upon completion of a precision boring and burnishing operation, the handgrip member 25 is rotated to retract the shifting rod 6 and to thus allow for retraction of the cutters 3 prior to withdrawal of the tool from the workpiece. The extent of which the cutters 3 are to be retracted can be determined by providing the spindle 15 with a scale 15a and by providing the handgrip member 25 with an index or pointer 25a which moves along the scale 15a. The graduations of the scale 15a indicate different axial positions of the shifting rod 6 and hence different radial positions of the cutters 3.

Referring to FIG. 3, the workpiece 27 is mounted in a two-piece support the lower portion 28 of which is secured to the table 29 of a vertical-spindle boring machine. The spindle 15 of the tool extends upwardly through and beyond the upper portion 30 of the support for the workpiece 27. The portions 28 and 30 are bolted or otherwise connected to each other upon insertion of the workpiece 27 and are thereupon connected to a hydraulic coolant circulating apparatus including a tank 31, a pump 32 and a filter 33. The spindle 15 is surrounded by sealing means 25a to prevent escape of coolant from the upper portion 30 of the support. The coolant is preferably oil which is circulated in the direction indicated by arrow A to pass through the annular space between the internal surface of the workpiece 27 and the tool and to thereby entrain the chips which are being removed by the cutters 3. The flow restricting cap 7 on the head 2 is located in the space between the cutters 3 and burnishing rollers 9 and its channesl 8 direct the streams of coolant into the spaces between the cutters 3, especially against the points where the cutters remove material from the workpiece 27.

The spindle 15 is surrounded by a composite flow regulating device having two semicylindrical shells 47 held together by an endless helical spring 49. The purpose of the device including the shells 47 is to reduce turbulence in the stream of coolant which is about to enter the upper end of the hole 27a in the workpiece 27.

The tank 31 is provided with baffles 31a over which the coolant flows toward the inlet of a pipe 32a connected to the inlet of the pump 32. The chips accumulate in the compartments 31b and 31c of the tank 31.

The spindle 15 is driven by the motor (not shown) of the boring machine.

FIG. 2 illustrates a portion of a modified boring and burnishing tool wherein the cutters 35 are movable radially in response to axial movement of a shifting rod 36 connected to a conical adjusting member 36a which tapers in a direction toward the rear end of the tool. Springs 37 react against the head 2a of the holder to urge the cutters 35 against the conical adjusting member 36a. The coupling element 38 of the member 36a extends forwardly beyond the head 2a and has a diametrically extending slot 39 for reception of a projection on a complementary coupling element which rotates the member 36a in order to move the cutters 35 radially under or against the action of springs 37.

The boring machine of FIG. 3 can be used with tools of the type shown in FIG. 1 or with those shown in FIG. 2. To this end, the lower end portion of the bore 40 in the lower portion 28 of the support for workpieces 27 receives a projection 42 in the form of a ledge or strip and resembling the working end of a screwdriver. The projection 42 is provided at the upper end of a hollow cylindrical coupling element 41 which is biased upwardly by a helical spring 43 so that the element 42 extends into the bore 40. When the tool including the structure shown in FIG. 2 is used in the boring machine of FIG. 3 and the cutters 35 advance downwardly beyond the hole 27a of the workpiece 27, the coupling element 38 of the adjusting member 36a moves into abutment with the projection 42 on the coupling element 42. The descending tool causes the coupling element 38 to stress the spring 43 by way of the coupling element 41 and, as the element 38 continues to rotate, the projection 42 snaps into the slot 39 under the action of the spring 43. Thus, the coupling element 41 is connected to the adjusting member 36a. When the spindle of the tool shown in FIG. 2 is brought to a halt, the operator causes an arresting member 44 to move in a direction to the right, as viewed in FIG. 3, against the opposition of a spring 45, whereby the end portion of the arresting member 44 enters an axially parallel peripheral groove 46 of the coupling element 41. If the operator thereupon rotates the spindle of the tool shown in FIG. 2 through about 180° in a direction to move the head 2a rearwardly while the projection 42 holds the adjusting member 36a against rotation with the spindle, the cutters 35 are retracted sufficiently to allow for withdrawal of the tool from the workpiece 27 without any danger that the cutters would contact the surface which has been treated by the burnishing rollers during penetration of the tool into the hole 27a. The arresting member 44 is surrounded by an annular sealing element 48 which is slidable in a bore of the portion 28 of the support for the workpiece.

The apparatus which includes the improved tool of FIG. 1 or 2 and the support 28, 30 of FIG. 3 exhibits the following advantages:

The tool is a substantially cylindrical body with outwardly extending cutters 3 or 35 and burnishing rollers 9. Therefore, the rotation of such body in the hole 27a of the workpiece 27 produces negligible turbulence in the stream of coolant. It was found that the flow of coolant is substantially laminar whereby the likelihood of agitating the chips which are removed by the cutters 3 or 35 is reduced to a minimum. Since the head 2 or 2a for the cutters 3 or 35 is rigid with the back support 1 for the burnishing rollers 9, the two work-treating portions of the tool remain coaxial with each other to thus insure a highly satisfactory treatment of the internal surface of the workpiece. The cutters 3 or 35 can be readily removed and replaced by fresh cutters or by otherwise dimensioned cutters as soon as the tool is withdrawn from the hole of a workpiece. Referring to FIG. 1, the cutters 3 can be withdrawn in response to removal of screws 2D which connect the two sections 2A and 2B of the head 2. The cage 10 with the burnishing rollers 3 can be removed upon detachment of the head 2 from the back support 1. By placing a ring between the conical adjusting member 5 and the inner edge faces of the cutters 3, the operator can move the cutters radially outwardly so that the tool can be used for removal of material from workpieces having relatively large open-end holes. The improved tool can be used with equal advantage in milling machines, lathes or analogous machine tools. The overall time for boring and burnishing is extremely short because the burnishing operation takes place simultaneously with the boring operation. Since the fluid evacuates the chips in a direction away from the burnishing rollers, the burnishing action is highly satisfactory because the rollers need not roll over chips during movement of cutters toward the lower end of the workpiece 27 shown in FIG. 3.

The adjustment of cutters radially of the holder including the head 2 or 2a and the back support 1 takes place from without the tool, i.e., from the front or rear end of the tool. This renders it possible to retract the cutters prior to withdrawal of the tool from the hole of the workpiece so that the cutting edges cannot deface the surface which has been treated by the burnishing rollers. As mentioned before, the burnishing rollers are retracted radially of the holder in automatic response to movement of the tool counter to the direction of fluid flow through the hole of the workpiece.

The tool of FIG. 2 is utilized for treatment of workpieces having relatively long open-end holes so that the tool should be provided with a solid spindle in contrast to the hollow spindle 15 shown in FIGS. 1 and 3. In the embodiment of FIG. 2, the axial position of the conical adjusting member 36a (and hence the radial position of the cutters 35) can be changed by connecting the coupling element 38 to the complementary coupling element 41, by holding the coupling element 38 against rotation by way of the coupling element 41 (see the arresting member 44) when the torque transmitting connection between the motor of the machine tool and the spindle of the tool shown in FIG. 2 is terminated, and by thereupon rotating the holder including the head 2a (preferably by way of the spindle) to move the conical adjusting member 36a axially in a direction to allow the springs 37 to move the cutters 35 radially inwardly. The tool of FIG. 2 is then ready to be withdrawn from the hole of the workpiece. A rotation of the head 2a through about 180° normally suffices to effect a desired retraction of cutters 35 toward the axis of the shifting rod 36.

The clearance between the external surface of the flow restricting member 7 and the internal surface of the hole in the workpiece is preferably in the range of one or more tenths of a millimeter. The streams of coolant which are permitted to flow through the channels 8 of the flow restricting member 7 not only cool the cutters but also entrain and remove the chips from the hole of the workpiece in a direction away from the burnishing rollers. The rate of flow of coolant through the channels 8 is relatively high so that the streams flowing through these channels entrain all of the chips including those which tend to remain in the shallow grooves formed by the cutting edges in the internal surface of the workpiece during rotation and axial movement of the tool in a direction toward the lower end of the workpiece shown in FIG. 3. This enables the burnishing rollers 9 to treat the internal surface of the workpiece with a high degree of accuracy so that the thus treated workpiece is ready for reception of a male part with minimal clearance.

The improved apparatus can be used with particular advantage in vertical-spindle boring machines which are normally available in all or nearly all machine shops, including relatively small shops. Such machine shops are also provided with means for circulating a stream of oil or another suitable coolant so that the parts of the apparatus which must be furnished to cooperate with available parts merely include the support and the combined boring and burnishing tool.

Without further analysis, the foregoing will so fully reveal the gist of the present invention that others can, by applying current knowledge, readily adapt it for various applications without omitting features which fairly constitute essential characteristics of the generic and specific aspects of the aforedescribed contribution to the art and, therefore, such adaptations should and are intended to be comprehended within the meaning and range of equivalence of the claims.

What is claimed as new and desired to be protected by Letters Patent is set forth in the appended claims:

1. In a machine tool, particularly in a vertical-spindle boring machine, apparatus for precision boring and burnishing of workpieces having open-end holes, said apparatus comprising a hollow support for reception of a workpiece; means for circulating a fluid through the hole of the workpiece in said support so that the fluid enters at one end and leaves at the other end of the hole; and a combined boring and burnishing tool having a front end and a rear end and including a holder movable axially into and toward or away from the other end of the hole in the workpiece in said support, a spindle operatively connected with and arranged to rotate said holder, at least one cutter mounted in said holder at the front end of said tool to remove material from the workpiece in said support during rotation and axial movement of said holder toward said other end of the hole whereby the thus removed material is evacuated by said fluid, said cutter being movable substantially radially of said holder, adjusting means accessible at one end of said tool and being actuatable to effect a retraction of said cutter into said holder prior to movement of said holder away from the other end of the hole in the workpiece in said support, at least one burnishing element mounted in said holder behind said cutter, as considered in the direction of fluid flow through the hole of the workpiece in said support, to treat the internal surface of the workpiece behind said cutter, said burnishing element being movable substantially radially of said holder, and means for retracting said burnishing element from engagement with the workpiece in response to movement of said holder away from said other end of the hole in the workpiece in said support.

2. Apparatus as defined in claim 1, wherein said support includes a plurality of separable portions defining a chamber for a workpiece, and said holder includes a back support having a conical external surface, said burnishing element constituting a roller which rolls along said conical surface and along the internal surface of the workpiece in said support while said holder rotates and moves axially toward the other end of the hole in such workpiece.

3. Apparatus as defined in claim 1, wherein said spindle is provided at the rear end of said tool and said adjusting means includes a portion which is accessible at said rear end of said tool.

4. Apparatus as defined in claim 1, wherein said adjusting means is accessible at said front end of said tool and further comprising actuating means extending into said support to engage said adjusting means upon completed movement of said cutter to said other end of the hole in the workpiece in said support.

5. Apparatus as defined in claim 1, wherein said adjusting means includes a conical portion axially movably mounted in said holder and said tool further comprises means for biasing said cutter against said conical portion so that said cutter moves radially under the action of or against the opposition of said biasing means in response to axial movement of said conical portion.

6. Apparatus as defined in claim 5, wherein said spindle is hollow and is located at said rear end of said tool, said adjusting means further comprising shifting means connected with said conical portion and extending into said spindle and actuating means provided on said spindle and operable by hand to move said conical portion axially by way of said shifting means.

7. Apparatus as defined in claim 6, wherein said actuating means comprises a gear rotatably mounted in said spindle and arranged to move said shifting means axially in response to rotation thereof, and means for rotating said gear.

8. Apparatus as defined in claim 7, wherein said means for rotating said gear comprises a pinion mating with said gear and eccentrically mounted in said spindle, and an internally toothed sleeve mataing with said pinion and rotatably surrounding said spindle.

9. Apparatus as defined in claim 1, wherein said adjusting means comprises a conical member axially movably mounted in said holder to move said cutter radially of said holder in response to axial movement thereof, said conical member having an exposed first coupling portion at said front end of said tool, and a complementary second coupling portion extending into said support to engage said first coupling portion upon completed movement of said holder toward the other end of the hole in the workpiece of said support.

10. Apparatus as defined in claim 9, wherein said second coupling portion is rotatable relative to said support in response to engagement with said first coupling portion, said adjusting means further comprising arresting means actuatable upon stoppage of said spindle to hold said first coupling portion against rotation by way of said second coupling portion so that said conical member is movable axially of said holder in response to rotation of said holder upon actuation of said arresting means.

11. Apparatus as defined in claim 1, wherein said tool further comprises flow restricting means surrounding said holder between said cutter and said burnishing element to throttle the flow of fluid in the hole of the workpiece in said support during movement of said holder toward the other end of the hole.

12. Apparatus as defined in claim 11, wherein said flow restricting means has at least one channel arranged to direct fluid against the region of contact between the workpiece and said cutter.

* * * * *